United States Patent [19]

Bartish et al.

[11] 4,325,932

[45] Apr. 20, 1982

[54] METHOD OF PRODUCING NITROUS OXIDE

[75] Inventors: Charles M. Bartish, Bethlehem, Pa.; Donald F. Tucker, Doraville, Ga.

[73] Assignee: Air Products and Chemicals, Inc., Allentown, Pa.

[21] Appl. No.: 219,166

[22] Filed: Dec. 22, 1980

[51] Int. Cl.³ ............................................ C01B 21/22
[52] U.S. Cl. .................................................... 423/402
[58] Field of Search ................................ 423/400, 402

[56] References Cited

U.S. PATENT DOCUMENTS 3,321,274 5/1967 Slaugh ................................... 423/402

OTHER PUBLICATIONS

Meyer et al.; "J.A.C.S."; Mar. 17, 1976; pp. 1364–1371.
Kubota et al.; "J.A.C.S."; Jan. 4, 1978; pp. 342–343.

*Primary Examiner*—G. O. Peters
*Attorney, Agent, or Firm*—William F. Marsh; James C. Simmons; E. Eugene Innis

[57] ABSTRACT

Nitrous oxide can be produced by reacting nitric oxide and carbon monoxide in the presence of a catalyst in an anhydrous system. The preferred catalyst is a mixture of $PdCl_2$, $CuCl_2$ and $LiCl$, which is dissolved in anhydrous methanol.

7 Claims, No Drawings

METHOD OF PRODUCING NITROUS OXIDE

This invention relates to a method of producing nitrous oxide.

Commercially, nitrous oxide is prepared by the thermal decomposition of ammonium nitrate according to the reaction:

$$NH_4NO_3 \rightarrow N_2O + 2H_2O$$

This is, however, a relatively hazardous procedure, and alternative procedures have been investigated on a laboratory scale. Amongst such procedures Kubota et al in the Journal of the American Chemical Society; Jan. 4, 1978; P342–3 showed that the reaction:

$$2NO + CO \rightarrow CO_2 + N_2O$$

proceeded at 25° C. in an aqueous solution containing $PdCl_2$, $CuCl_2$ and $LiCl$. Whilst Kubota et al did not observe any hydrogen by-product, when we tried to accelerate the process to commercially acceptable rates by increasing the pressure and temperature, we observed that the product gas also contained substantial quantities of undesirable hydrogen (in excess of 5% by volume).

We have found that if NO and CO are reacted in the presence of $PdCl_2$, $CuCl_2$ and LiCl dissolved in an anhydrous alcohol, acceptable quantities of of nitrous oxide are obtained with very little hydrogen as by-product.

According to the present invention, there is provided a method of producing nitrous oxide by reacting nitric oxide and carbon monoxide in the presence of a catalyst containing $PdCl_2$, $CuCl_2$ and A, wherein A is selected from the group consisting of LiCl, NaCl, KCl, $MgCl_2$ and $CaCl_2$ characterized in that said catalyst is dissolved in an anhydrous alcohol.

Preferably, the alcohol contains from 1 to 4 carbon atoms and is preferably methanol.

Advantageously, the reaction mixture contains as catalyst:

from 0.001 to 0.1% (g. moles/liter) $PdCl_2$;
from 0.001 to 0.1% (g. moles/liter) $CuCl_2$; and
from 0.001 to 0.2% (g. moles/liter) A; and more preferably
0.1% (g. moles/liter) $PdCl_2$
0.2% (g. moles/liter) $CuCl_2$
0.6% (g. moles/liter) A The reaction is preferably carried out at between 25° C. and 150° C., and more preferably between 50° C. and 75° C.

Similarly, the pressure of the reaction is preferably between 14 psia and 1000 psia, and more preferably from 100 psia to 500 psia.

Preferably, the ratio of Pd to Cl (in A) (by moles) is equal to or greater than 1:2. In such conditions the amount of carbon dioxide produced is suppressed which facilitates separation of the product nitrous oxide from carbon dioxide and inhibits loss of expensive carbon monoxide.

The present invention is not restricted to the preferred catalyst and is applicable to anhydrous systems generally. Accordingly, the present invention also provides a method of producing nitrous oxide by reacting nitrous oxide and carbon monoxide in the presence of a catalyst, characterized in that the reacton is carried out in an anhydrous system.

If desired, other anhydrous non-protic organics such as dioxane and tetrahydrafuran may be used in place of the anhydrous alcohol.

For a better understanding of the invention, reference will now be made to the accompanying Examples.

EXAMPLES 1 AND 2

Referring to Table 1, various amounts of $PdCl_2$, $CuCl_2$, and LiCl were placed in a 125 ml stirred glass lined pressure reactor, together with 50 ml methanol which had been dried with sodium. The reactor was then pressurized to $P_1$ psig with nitric oxide and then to a total pressure of $[P_1 + P_2]$ psig with carbon monoxide. The reactor was then heated to a specified temperature T°C. in an oil bath and held at this temperature for one hour during which time a substantial drop in pressure was observed. The reactor was removed from the oil bath, and the gas was analyzed by gas chromatography for hydrogen, carbon dioxide, and nitrous oxide.

On examination, it was ascertained that the hydrogen produced in Examples 1 and 2 was formed by the conversion of some of the methanol to dimethyl carbonate according to the reaction:

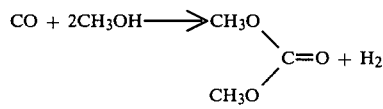

EXAMPLE 3

In Example 3, the procedure of Examples 1 and 2 was repeated except that 1.1 ml of water was added to the reactor before pressurization. It will be noted that although the yield of nitrous oxide was relatively high, considerable amounts of hydrogen were produced thereby removing a substantial amount of carbon monoxide from the system.

EXAMPLES 4 AND 5

The procedure of Examples 1 and 2 was repeated. In both examples the catalyst precipitated and hydrogen was formed. It was concluded that the catalyst must be dissolved in the anhydrous alcohol to be effective.

TABLE 1

| | Partial Pressure psig | | | | | | | | Analysis (Vol. %) | | |
|---|---|---|---|---|---|---|---|---|---|---|---|
| | $P_1$ | $P_2$ | | | | | MeOH | H2O | | | |
| Example | NO | CO | T°C. | $PdCl_2$(M) | $CuCl_2$(M) | $LiCl_2$(M) | Anh. (ml) | (ml) | $N_2O$ | $CO_2$ | $H_2$ |
| 1 | 160 | 90 | 80 | 0.10 | 0.20 | 0.20 | 50 | | 21.8 | 17.6 | 0.1 |
| 2 | 130 | 70 | 80 | 0.10 | 0.20 | 0.60 | 50 | | 23.9 | 2.9 | 0.1 |
| 3 | 200 | 100 | 72 | 0.10 | 0.20 | 0.20 | 50 | 1.1 | 31.0 | 44.3 | 13.3 |
| 4 | 150 | 75 | 75 | 0.10 | 0.20 | 0.20 | 50 | | 14.7 | 34.7 | 20.0* |

TABLE 1-continued

| Example | Partial Pressure psig | | T°C. | $PdCl_2$(M) | $CuCl_2$(M) | $LiCl_2$(M) | MeOH Anh. (ml) | H2O (ml) | Analysis (Vol. %) | | |
| | $P_1$ NO | $P_2$ CO | | | | | | | $N_2O$ | $CO_2$ | $H_2$ |
| --- | --- | --- | --- | --- | --- | --- | --- | --- | --- | --- | --- |
| 5 | 145 | 75 | 85 | 0.10 | 0.20 | 0.20 | 50 | | 28.2 | 56.9 | 28.7* |

*Catalyst precipitated
(M) = gm. moles per liter of reaction mixture

What is claimed is:

1. A method for producing nitrous oxide by reacting nitric oxide and carbon monoxide in the presence of a catalyst containing $PdCl_2$, $CuCl_2$ and A, wherein A is selected from the group consisting of LiCl, NaCl, KCl, $MgCl_2$ and $CaCl_2$, characterized in that said catalyst is dissolved in an anhydrous alcohol.

2. A method according to claim 1, characterized in that said alcohol is methanol.

3. A method according to claim 1, characterized in that the reaction mixture contains as catalyst:
   from 0.001 to 0.1% (g. moles/liter) PdCl;
   from 0.001 to 0.1% (g. moles/liter) $CuCl_2$; and
   from 0.001 to 0.2% (g. moles/liter) A.

4. A method according to claim 3, characterized in that the reaction mixture contains as catalyst:
   0.1% (g. moles/liter) $PdCl_2$
   0.2% (g. moles/liter) $CuCl_2$
   0.6% (g. moles/liter) A.

5. A method according to any preceding claim, characterized in that said reaction is carried out at from 25° C. to 150° C.

6. A method according to any preceding claim characterized in that said reaction is carried out at from 14 psia to 1000 psia.

7. A method according to any preceding claim characterized in that the ratio of Pd to Cl (in A) is (by moles) equal to or greater than 2:1.

* * * * *